United States Patent [19]

Klemm

[11] Patent Number: 4,772,040
[45] Date of Patent: Sep. 20, 1988

[54] DEVICE FOR COUPLING A TRAILER TO A TOWING VEHICLE

[76] Inventor: Roland A. Klemm, 408 NE. 28 Rd., Boca Raton, Fla. 33431

[21] Appl. No.: 60,825

[22] Filed: Jun. 12, 1987

[51] Int. Cl.⁴ .............................................. B62D 1/06
[52] U.S. Cl. ................................. 280/490 R; 280/511; 280/477; 280/478 R
[58] Field of Search ............... 280/490 A, 490 R, 505, 280/511, 477, 478 R, 461 A, 460 A, 456 A, 415 A, 415 R

[56] References Cited

U.S. PATENT DOCUMENTS 2,142,365  1/1939  McKee .............................. 280/490 R
4,199,167  4/1980  Points ............................... 280/415 A
4,340,240  7/1982  Anderson ......................... 280/415 A Primary Examiner—John J. Love
Assistant Examiner—Donn McGiehan
Attorney, Agent, or Firm—John H. Faro

[57] ABSTRACT

A device for releasably coupling a trailer to a towing vehicle comprising a support plate mountable on the towing vehicle, and a parallelogram-like arrangement of articulated mechanical members mounted on the support plate including a lifting bar movable between a raised position and a lowered position. A hitching ball that is matable with a socket on the trailer is mounted on the lifting bar. Mechanical means are provided for moving the lifting bar between its raised position and its lowered position. Also, means are provided for locking the device in its raised position.

13 Claims, 1 Drawing Sheet

DEVICE FOR COUPLING A TRAILER TO A TOWING VEHICLE

BACKGROUND OF THE INVENTION

1. Field of the Invention

This invention relates to a novel device for releasably coupling a trailer to a towing vehicle, and particularly to an entirely mechanical device which is especially adapted for recreational use with a family automobile as the towing vehicle.

2. Description of the Prior Art

Much recreational equipment is transported by its users on trailers which are equipped with a drawbar having a hitching socket or yoke thereon. The towing vehicle is equipped with a hitching ball that is adapted to mate with the hitching socket on the trailer. Usually, the hitching ball is fixedly mounted on the towing vehicle, such as on the bumper of the vehicle. For coupling and uncoupling, the drawbar is physically raised to put the socket on or off the hitching ball.

Where the towing vehicle is a family automobile, it is desirable that the hitching ball and its support is low in initial cost, requires little maintenance, and is easily mounted and dismounted on the vehicle. It is also desirable that the coupling device assist in lifting the drawbar of the trailer.

When positioning a trailer in a limited space or in a precise location, at least for an occasional trailer user, it is easier to maneuver the trailer when it is coupled to the front of the towing vehicle rather than the rear. This front mounting is also advantageous at night when the vehicle headlights can illuminate the trailer, and also on a boat ramp where the rear wheels of the towing vehicle are furtherest from the water.

Many hitches and couplings have been suggested for coupling trailing carriages to farm tractors, highway trucks and automobiles, which devices are not particularly adapted for recreational use. Some devices include means for assisting the user in lifting the drawbar. For example, U.S. Pat. No. 4,148,499 to H. J. Johnson, describes a device comprising a support plate that is permanently mounted on the rear of the towing vehicle. The device includes a hitching ball mounted on a platform, a hydraulic cylinder and piston mounted between the support plate and the platform for raising and lowering the hitching ball, and a hydraulic system for operating the piston and cylinder. Such an arrangement is not adapted for a recreational user because it is too expensive to buy, install and to operate for recreational use; it is not easily mounted and dismounted on the towing vehicle; it is too bulky; and it is too complex to maintain economically.

OBJECTS OF THE INVENTION

An object of this invention is to provide a novel device for releasably coupling a trailer to a towing vehicle.

Another object of this invention is to provide such a novel device which is particularly adapted for recreational use with a family automobile as the towing vehicle.

Another object of this invention is to provide such a novel device that is low in initial cost and also has low subsequent maintenance costs.

Still another object of this invention is to provide such a novel device which is not bulky and is easily mounted and dismounted on the towing vehicle.

A further object of this invention is to provide such a novel device which assists the user in raising and lowering the drawbar of the towing vehicle, is entirely mechanical, and does not include any pneumatic, hydraulic or electrical components.

SUMMARY OF THE INVENTION

The novel device comprises a support plate adapted for mounting on a towing vehicle, and a parallelogram-like arrangement of articulated members mounted on the support plate. The arrangement includes a movable lifting bar having a hitching ball mounted thereon, and mechanical means for moving the lifting bar between a raised position and a lowered position. The device may include means for fixedly or removably mounting the support plate on the towing vehicle and particularly the bumper of an automobile. The articulated arrangement may include a pair of vertically-spaced links pivotally attached to each of the lifting bar and the support plate. One of the links, preferably the lower link, may be elongated beyond its pivot to the support plate to form a lifting lever which, when rotated by a rotating means, including a hand-operated pull lever, can raise and lower the lifting bar. The device may include means for locking the lifting bar in its raised position.

DESCRIPTION OF THE INVENTION INCLUDING THE PREFERRED EMBODIMENTS

Figures 1, 2, 3:
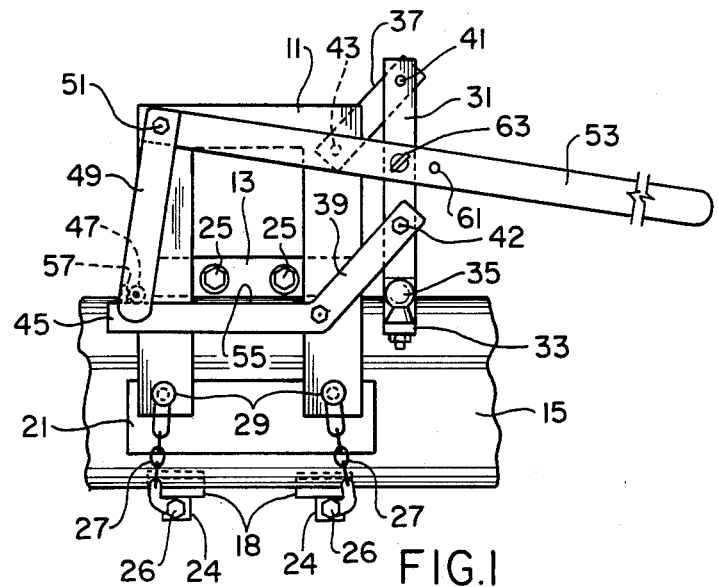
FIG. 1 is a front elevational view of a preferred embodiment of the novel device with its hitching ball in its raised position.
FIG. 2 is a front elevational view of the preferred embodiment of the novel device with its hitching ball in its lowered position.
FIG. 3 is a side elevational view of the device shown in FIG. 2 viewed along section line 3—3.

The following description of some of the preferred embodiments of the concepts of the invention is made in reference to the accompanying figures. Where an individual element in these figures is depicted in more than one figure, it is assigned a common reference numeral for simplification of identification and understanding.

The preferred embodiment shown in FIGS. 1, 2, and 3 includes a U-shaped support plate 11 having a crossbrace 13 welded across the legs of the plate 11. The legs of the U-shaped plate 11 are attached to the front bumper 15 of a family automobile as the towing vehicle. The support plate 11 may be fixedly or detachably attached to the front or rear bumper of the automobile, or to any other practical part of the towing vehicle. The towing vehicle may be any type of motorized vehicle for transporting or moving a trailer.

As shown in FIGS. 1, 2 and 3, the support plate 11 is detachably clamped to the bumper 15 with two upper clamps 17 and two lower clamps 18 which hook over the upper and lower edges respectively of the bumper 15. Because of the contour of the bumper 15, the support plate 11 bears on the protruding portion or brow 19 of the bumper (FIG. 3) and a wood block 21 properly spaces the support plate 11 from the recessed portions of the bumper 15, so that the support plate 11 is substantially vertically oriented. Each clamp 17 and 18 has a threaded nut 23 and 24 welded thereto. An upper bolt 25 passes through the cross brace 13 and threads into each of the upper nuts 23 to draw up the upper clamp 17. A lower bolt 26 threads into each of the lower nuts 24, and the head of each lower bolt 26 is connected by a link chain 27 to a holding pin 29 in the support plate 11. The lower clamps 18 are drawn up by rotating the lower bolts 26 in the lower nuts 24.

Mounted on the support plate 11 is a parallelogram-like arrangement of articulated members including a vertically-oriented lifting bar 31. A platform 33 of angle iron is bolted or welded to the lower end of the lifting bar 31. A hitching ball 35 is bolted to the platform 33. An upper link 37 and a lower link 39, vertically-spaced from one another, are pivotally-attached to the lifting bar 31 by upper and lower bar pivots 41 and 42 at their one ends; and are also pivotally-attached at their other ends to the support plate 11 by upper and lower plate pivots 43 and 44. Rotation of the links 37 and 39 causes the lifting bar 31 to move up or down. The upper and lower links 37 and 39 are of equal length, although they may be designed to have different lengths; for example, to change the horizontal movement of the ball 35 as the lifting bar 31 is raised and lowered.

The lower link 39 is elongated beyond the lower plate pivot 44 to provide an integral lifting lever 45. Clockwise rotation of the lifting lever 45 lowers the lifting bar 31 to the position shown in FIG. 2. Counter-clockwise rotation of the lifting lever 45 raises the lifting bar 31 to the position shown in FIG. 1. The upper link 37 is on one side of the support plate 11 and the lifting bar 31, and the lower link 39 is on the other side of the support plate 11 and lifting bar 31, so that the lifting bar 31 is in the same plane as the support plate 11.

The lifting lever 45 is rotated by a roller 47, such as a roller-bearing cam follower, mounted at the extended end of a rotating lever 48 which is pivotally-mounted at its other end to said support plate 11 by a lever pivot 51. Integral with the rotating lever 49 and extending on the other side of the lever pivot 51 is a relatively long pull lever 53. The roller 47 bears on the edge 55 of the lifting lever 45 and rides along most of the length of said edge 55 and then back when moving the lifting bar 31 between its lowered position (FIG. 2) and its raised position (FIG. 1). Since the lifting lever 45 is weight-biased by the lifting bar 31 and the links 37 and 39, the lifting lever 45 bears against the roller 47 in all positions. The said edge 55 of the lifting lever 45 near the extended end thereof has an upstanding stop pin 57 therein for preventing the roller 47 from rolling off the end of the lifting lever 45. The pull lever 53 has a clear locking hole 59 therein, and also a threaded storage hole 61 therein for storing a locking pin 63 as shown in FIG. 2. The lifting bar 31 has a threaded locking hole 65 therein (FIG. 2). When the lifting bar 31 is in the raised position, as shown in FIG. 1, the locking pin 63 is unscrewed from the storage hole 61 and passed through the clear locking hole 59 and screwed into the threaded locking hole 65 in the lifting bar 31, which holes 59 and 65 are opposite one another in the position shown in FIG. 1.

To use the novel device, it is first mounted on the towing vehicle; for example, as described above. Then, starting with the device as shown in FIG. 1, the locking pin 63 is unscrewed and stored in the threaded storage hole 61. The pull lever 53 is rotated counter-clockwise causing the roller 47 to move away from the stop 57 and permitting the lifting lever 45 to rotate clockwise, lowering the lifting bar 31. Continued counter-rotation of the pull lever 53 causes the roller 47 to move back to the stop pin 57 but permits the continued clockwise rotation of the lifting lever 45 until the device is in the lowered position shown in FIG. 2. In this position, the socket or yoke on the trailer is placed above the hitching ball 35. The lifting bar 31 and hitching ball 35 are now raised to the raised position shown in FIG. 1 by rotating the pull lever 53 clockwise mating the ball into the socket. This causes the roller 47 to move away from the stop pin 57 down the edge of the lifting lever 45 and then back to the stop pin 57, continuously pressing on and rotating the lifting lever 47 counter-clockwise. With the lifting bar 31 in the raised position, the locking pin 63 is removed from the storage hole 63, passed through the clear hole 59 in the pull lever 53 and screwed into the threaded hole 65 in the lifting bar 31. With the device in the raised position (FIG. 1), the rotating lever 49 is overcentered eliminating the strain on the device to return to the lowered position.

Thus, there has been described a novel device for coupling a trailer to a towing vehicle that is easily mounted and dismounted on the bumper of a passenger automobile, is of a simple, low cost construction, is entirely mechanical thereby avoiding all of the complications of pneumatic, hydraulic and electrical systems. Examination of FIG. 3, clearly shows the lack of bulkiness and the compact character of the device. Finally, the novel device provides the user with assistance in raising the socket and drawbar on the trailer carriage with mechanical advantage and the obvious benefit of pushign down on the pull lever rather than manually lifting the drawbar of the trailer.

The foregoing figures and the description of the preferred embodiment is provided as illustrative of the concepts of the invention. While the preferred embodiment represents what is regarded as the best mode for practicing the invention at the present time, it is not limited as delineating the scope of the concepts disclosed herein, which are set forth in the following claims.

What is claimed is:

1. A device for releasably coupling a trailer to a towing vehicle, said trailer having a socket adapted to mate with a hitching ball on said vehicle, said device comprising a support plate, a parallelogram-like arrangement of articulated members mounted to said support plate, said arrangement including a movable vertically-oriented lifting bar having said hitching ball mounted thereon, a pair of vertically-spaced links pivotally attached to each of said lifting bar and said support plate, and mechanical means for moving said lifting bar between a raised position and a lowered position, said moving means including a lifting lever integral with one of said links, said lifting lever extending in cantilever fashion from the pivot between said support plate and said one link, and means for rotating said lifting lever about said pivot.

2. The device defined in claim 1, including means for mounting said support plate on said vehicle.

3. The device defined in claim 1, including means for removably mounting said supply plate on a bumper of said vehicle.

4. The device defined in claim 1, wherein said rotating means includes a pull lever and an integral rotating lever pivotally mounted therebetween to said support plate, said rotating lever having a rotatable roller attached thereto, said roller being movable in rolling contact with said lifting lever to rotate said lifting lever by movement of said pull lever.

5. The device defined in claim 1, including mechanical means for locking said lifting bar in said raised position.

6. The device defined in claim 5, wherein said lifting bar has a threaded first aperture therein, said pull lever has a second aperture therein, said first and second apertures being opposite one another when said lifting bar is in said raised position, and a locking bolt adapted to pass through said second aperture and to screw into said first aperture.

7. A device for releasably connecting a wheeled trailer to an automotive towing vehicle, said trailer having a drawbar and a hitching socket attached thereto, said socket being adapted to mate with a hitching ball on said towing vehicle, said device comprising a metal support plate adapted for mounting on said vehicle with the major surfaces thereon in a substantially vertical orientation, a lifting bar having a substantially horizontal platform and said hitching ball attached to said platform, an upper link and a lower link, each link being pivotally connected to both said support plate and said lifting bar forming a substantially parallelogram-like arrangement of articulated members, and mechanical means for moving said lifting bar between a raised position and a lowered position, and means for locking said lifting bar in said raised position, said moving means including a lifting lever integral with said lower link and extending in cantilever fashion from the pivot between said support plate and said lower link, and means for rotating said lifting lever between positions so as to move said lifting bar between said raised position and said lowered position.

8. The device defined in claim 7, including means for mounting said support plate in said substantially vertical orientation on a bumper of said towing vehicle.

9. The device defined in claim 8, wherein said mounting means includes means for clamping said support plate to said bumper without modifying said bumper.

10. The device defined in claim 7, wherein said rotating means includes a pull lever and an integral rotating lever pivotally mounted therebetween to said support plate, a roller mounted on said rotating lever near the end thereof, said roller continuously engaging one surface of said lifting lever while said pull lever is rotated to move said lifting bar between said raised and lowered positions.

11. The device defined in claim 10, including a stop attached to said one surface near the extended end of said lifting lever, said stop being adapted to prevent said roller from rolling off said extended end of said lifting lever.

12. The device defined in claim 11, wherein said pull lever and said lifting bar each have an aperture therein, which apertures are aligned with one another when said lifting bar is in said raised position, said apertures, when aligned, being otherwise adapted to receive a locking means removably fixed therein.

13. The device defined in claim 12, wherein said locking means includes a lock screw mountable through a first aperture in said pull lever and engagable into a threaded second aperture in said lifting bar, said first aperture being opposite said second aperture when said lifting bar is in said raised position.

* * * * *